US 6,583,755 B2

(12) United States Patent
Martinerie et al.

(10) Patent No.: US 6,583,755 B2
(45) Date of Patent: Jun. 24, 2003

(54) METHOD AND APPARATUS FOR LOCATING A TERRESTRIAL TRANSMITTER FROM A SATELLITE

(75) Inventors: Francis Martinerie, Labarthe sur Leze (FR); Jean-Marc Bassaler, Toulouse (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/043,327

(22) Filed: Jan. 14, 2002

(65) Prior Publication Data

US 2002/0126043 A1 Sep. 12, 2002

(30) Foreign Application Priority Data

Jan. 15, 2001 (FR) ............................................. 01 00463

(51) Int. Cl.$^7$ .............................................. H04B 7/185
(52) U.S. Cl. ................................................. 342/357.01
(58) Field of Search ....................... 342/357.01, 357.02, 342/352, 450

(56) References Cited

U.S. PATENT DOCUMENTS

| 3,949,400 A | | 4/1976 | Shores |
| 4,276,553 A | | 6/1981 | Schaefer |
| 5,412,389 A | | 5/1995 | Olds |
| 6,018,312 A | * | 1/2000 | Haworth ..................... 342/353 |
| 6,266,012 B1 | * | 7/2001 | Kangas et al. .............. 342/387 |
| 6,317,049 B1 | * | 11/2001 | Toubia et al. ............. 340/573.4 |
| 6,417,799 B1 | * | 7/2002 | Aubain et al. .............. 342/356 |

* cited by examiner

Primary Examiner—Dao Phan
(74) Attorney, Agent, or Firm—Sughrue Mion, PLLC

(57) ABSTRACT

The invention provides a method of determining the location of one or more terrestrial transmitters by measuring the electromagnetic field vector at a plurality of instants from an antenna of a satellite. The propagation direction of the electromagnetic field and the location of the transmitter are determined on the basis of the measured vectors. The invention also provides methods of locating a terrestrial transmitter by using a plurality of optionally geostationary satellites. The invention also provides a satellite comprising an antenna and means for implementing such methods.

10 Claims, 1 Drawing Sheet

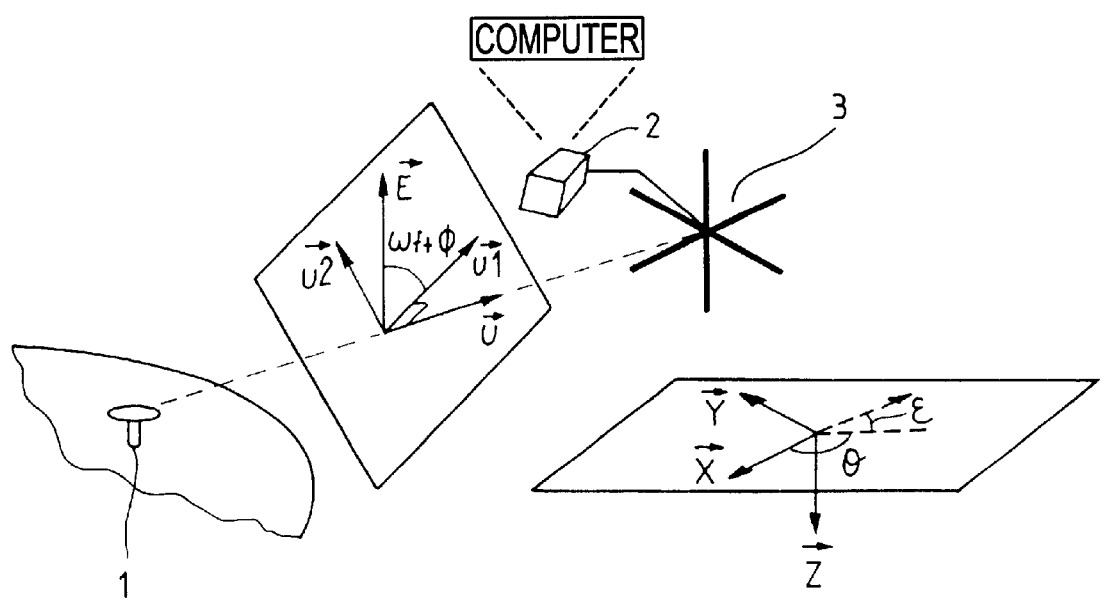
FIG_1
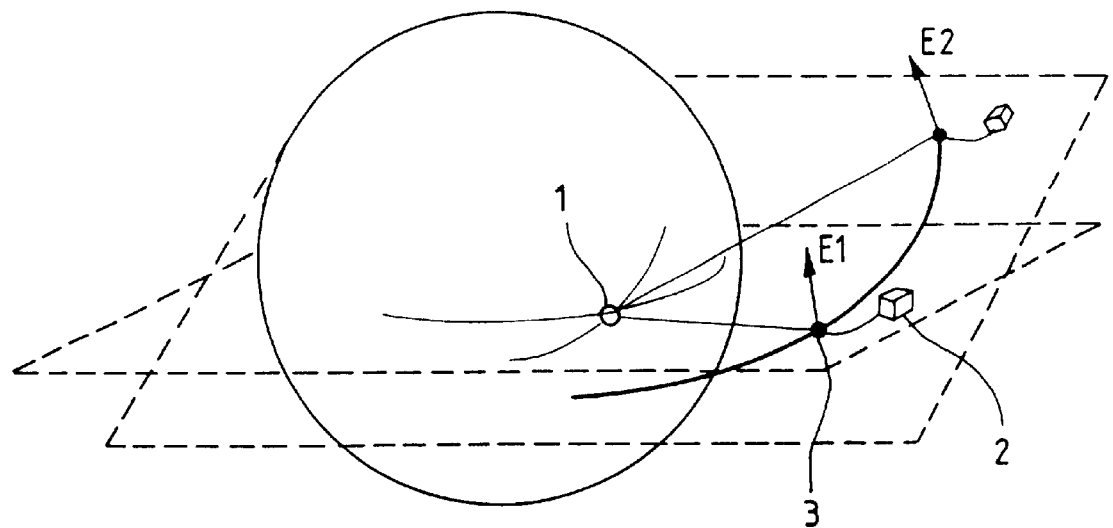
FIG_2

METHOD AND APPARATUS FOR LOCATING A TERRESTRIAL TRANSMITTER FROM A SATELLITE

The invention relates to apparatuses for locating transmitters, and in particular to methods of locating terrestrial transmitters by satellite.

BACKGROUND OF THE INVENTION

Document U.S. Pat. No. 3,949,400 discloses the use of a geostationary satellite and a ground station for determining the position of a beacon in a predetermined zone. The beacon transmits a particular signal enabling it to be identified. The satellite has an antenna beam scanning the intended zone in a predetermined cycle. The antenna beam detects signals only in a very precise direction. When the antenna beam is pointed towards the beacon, then the satellite intercepts the signal from the beacon and thus determines the position of the beacon as a function of the position of the satellite and the position of the antenna beam in its scanning cycle. It returns the position of the beacon to a ground station.

Document JP-08 263 853 discloses using a control unit for steering an antenna towards a transmitting communications satellite. The control unit calculates the amplitudes of the movements to be imparted to the antenna so as to cause it to face the intended satellite and it controls antenna movement. More precisely, the antenna is steered by moving the antenna so as to determine the position in which the signal it receives from the transmitting satellite is at a maximum.

Nevertheless, those apparatuses and their methods of operation are suitable only for locating transmitters transmitting signals that are specifically intended to be detected.

Solution and performance analysis of geolocation by TDOA.IEEE Transactions on Aerospace and Electric Systems, Vol. 29, No. 4, October 1993, also discloses the use of a plurality of instruments in separate locations that are sufficiently spaced apart to enable travel time differences and/or Doppler differences to be measured.

The document "Principes de traitement des signaux radar et sonar" [The principles of processing radar and sonar signals], by Le Chevalier, published by Editions Masson, and the document "Méthodes à haute résolution" [High resolution methods] by S. Marcos, published by Editions Hermès, describe methods relating to locating transmitters by antenna systems. That type of device constitutes the basis for implementing processing by amplitude radio location, by phase radio location, or by the "high resolution" method enabling transmitters to be located on the basis of measurements performed on antenna arrays.

The document "Principes de traitement des signaux radar et sonar", by Le Chevalier, published by Editions Masson, also describes a method of locating a transmitter by using the properties of a directional antenna. The emitter is located by determining the pointing direction of the antenna for which the energy received by said antenna is at a maximum.

Such apparatuses do not enable non-authorized or jamming antennas to be detected which might disturb the operation of telecommunications systems. Those apparatuses require either a plurality of spaced-apart satellites each provided with an antenna for locating a transmitter, or else a single satellite presenting a plurality of antennas.

OBJECTS AND SUMMARY OF THE INVENTION

There therefore exists a need for an antenna which resolves one or more of those drawbacks. In this context, the invention provides a method of locating a terrestrial transmitter by means of a geostationary satellite provided with an antenna, the method comprising the steps consisting in: measuring, at the satellite, and at at least two different instants, three orthogonal components of an electromagnetic field transmitted by the terrestrial transmitter; calculating at least two electromagnetic field vectors from the measurements; determining the propagation direction of the electromagnetic field from the determined vectors; and locating the transmitter at the point of intersection between the surface of the earth and a straight line colinear with the propagation direction and passing through the satellite.

In a variant, the propagation direction of the electromagnetic field is determined by identifying a vector for which the square of the sum of its scalar products with the determined electromagnetic field vectors is at a minimum.

In another variant, the propagation direction of the electromagnetic field is determined by determining a vector defined by the sum of the vector products between at least two electromagnetic field vectors.

In another variant, the calculation step comprises multiplying the measured field components by the inverse of the antenna transfer function.

In yet another variant, locating is performed by at least two satellites, the method further comprising a step of triangulation on the locations determined by the two satellites.

Another implementation of the invention provides a method of using a moving satellite to locate a terrestrial transmitter transmitting a linearly polarized electromagnetic field, the method comprising the steps consisting in: measuring, at the satellite, and at at least two different instants, three orthogonal components of an electromagnetic field transmitted by the terrestrial transmitter; calculating electromagnetic field vectors from the measurements; for each measurement, determining a plane containing the propagation direction of the measured electromagnetic field and the satellite, on the basis of the calculated vectors; and locating the transmitter at the intersection of a plurality of circles where the planes intersect the surface of the earth.

Another implementation of the invention provides a method of using a plurality of satellites to locate a terrestrial transmitter transmitting a linearly polarized electromagnetic field, the method comprising the steps consisting in: measuring, at the satellites, and at a common instant, three orthogonal components of an electromagnetic field transmitted by the terrestrial transmitter; calculating electromagnetic field vectors from the measurements; for each measurement, determining a plane containing the propagation direction of the measured electromagnetic field and the satellite, on the basis of the calculated vectors; and locating the transmitter at the intersection of a plurality of circles formed by the intersections of the planes and the surface of the earth.

In a variant, these methods further comprise an additional measurement step using differential Doppler measurements, interferometry, or radio direction finding.

In yet another variant, these methods further comprise a step of frequency filtering the measured electromagnetic field.

The invention also provides a transmitter-locating satellite having an antenna and means for implementing the locating methods of the invention.

BRIEF DESCRIPTION OF THE DRAWING

Other characteristics and advantages of the invention will appear on reading the following description of an embodiment of the invention given by way of example and with reference to the accompanying drawing, in which:

FIG. 1 is a diagram of a satellite antenna receiving the electromagnetic field of a terrestrial transmitter; and FIG. 2 is a diagram showing the positions of a non-geostationary satellite implementing a second method of the invention.

MORE DETAILED DESCRIPTION

The invention proposes locating a terrestrial transmitter by measuring the electromagnetic field vector at different instants from a satellite antenna. The propagation direction of the electromagnetic field, and thus the location of the transmitter is determined on the basis of measured vectors. In the example below, the antenna receives three orthogonal components of the electromagnetic field, but, in the invention, it suffices to measure three components that are not coplanar in order to be able to reconstitute the field.

FIG. 1 shows a terrestrial transmitter E which transmits an electromagnetic field $\vec{E}$ whose propagation direction is represented by $\vec{u}$. A satellite 2 placed in earth orbit has an antenna 3 suitable for receiving three orthogonal components of the electromagnetic field, which is non-linearly polarized at the antenna.

The antenna used for receiving the electromagnetic field can present three orthogonal dipoles, e.g. suitable for receiving three mutually orthogonal components in linear polarization of an electromagnetic field. It is also possible to use an antenna suitable for receiving merely three components of the electromagnetic field that are not colinear, as mentioned above. Since the locating methods described below are substantially independent of electromagnetic field frequency, they are applicable in particular to a broad band type antenna capable of receiving several octaves, for example. By way of example, it is possible to use monopole antennas, frame antennas, loop antennas, or antennas based on dipoles.

The electromagnetic field is represented by a vector situated in a plane of polarization. At all times, the oscillations of the electromagnetic field are situated in said plane because regardless of the polarization of an electromagnetic field when transmitted, the electromagnetic field is always orthogonal to its own propagation direction.

The first implementation of the locating method comprises a first step consisting in measuring the three components of the electromagnetic field at different instants from a geostationary satellite. The propagation direction of the received electromagnetic field thus remains identical for each measurement. The instantaneous electromagnetic field vectors are determined from each electromagnetic field measurement. Thus, when the polarization of the electromagnetic field is non-linear, the various vectors as determined in this way are not colinear. One locating method comprises determining the propagation direction of the electromagnetic field, i.e. determining a vector $\vec{u}$ perpendicular to at least two vectors of the electromagnetic field as determined by the measurement.

A first method consists in performing $n$ electromagnetic field measurements and in determining $n$ vectors $\vec{E}n$ representative of said measurements, and in determining the unit vector $\vec{u}$ for which the sum of the projections of these $n$ vectors is the most favorable.

The electromagnetic field transmitted by the transmitter is written $\vec{E}$. The instantaneous coordinates of $\vec{E}$ in a frame of reference ($\vec{u}1$, $\vec{u}2$) of the polarization plane can be of the following form, for example, $$\vec{E}(E1.\cos(\omega t+\phi), E2.\sin(\omega t+\phi)).$$

The components of the vectors $\vec{E}n$ are represented in a frame of reference of the antenna ($\vec{X}, \vec{Y}, \vec{Z}$). To make calculation easier, a frame of reference ($\vec{X}, \vec{Y}, \vec{Z}$) is selected such that $\vec{u}1$ is placed in the plane ($\vec{X}, \vec{Y}$). The components of $\vec{E}$ in the frame ($\vec{X}, \vec{Y}, \vec{Z}$) are then presented in the following form:

$$\vec{E} = \begin{bmatrix} Ex \\ Ey \\ Ez \end{bmatrix} = \begin{bmatrix} E1.\cos(\omega t + \phi).(-\sin\theta) + E2.\sin(\omega t + \phi).(-\sin\varepsilon.\cos\theta) \\ E1.\cos(\omega t + \phi).(-\cos\theta) + E2.\sin(\omega t + \phi).(\sin\varepsilon.\sin\theta) \\ E2.\sin(\omega t + \phi).(-\cos\theta) \end{bmatrix}$$

Since the propagation direction is orthogonal to the polarization field, the following relationship must be true at all times:

$$\vec{E}.\vec{u} = 0$$

Thus, in practice, it suffices to determine the vector $\vec{u}$ for which the variable J as defined below is at a minimum: (the vector $\vec{u}$ is also defined by the azimuth angle θ and the elevation angle ε in the antenna frame of reference):

$$J(\theta, \varepsilon) = \sum_{i=1}^{n} (\vec{Ei}.\vec{u}(\theta, \varepsilon))^2$$

It is then possible to determine the position of the transmitter from the position of the satellite and the determined propagation vector $\vec{u}$. This can be done merely by defining a point of intersection between a straight line passing through the antenna in the same direction as the vector $\vec{u}$, and the surface of the earth. In general, two points on the surface of the earth will be determined in this way. The transmitter is to be found at that one of those points which is in sight of the antenna.

In another method, it is also possible to determine a vector $\vec{u}$ by taking the vector product of the various vectors $\vec{E}n$ multiplied by one another. For example, the vector $\vec{u}$ can be determined using the following formula:

$$\vec{u} = \sum_{i,j=1}^{n} (\vec{Ei} \wedge \vec{Ej})$$

while eliminating terms in $\vec{Ei} \wedge \vec{Ej}$ which do not point towards the earth.

In general, the antenna does not measure the real electromagnetic field but measures an electromagnetic field which involves the transfer function of the antenna. Thus, particularly when the antenna is not omnidirectional, it is desirable to include the antenna transfer function in the determination of the vectors $\vec{E}n$. A computer receives $n$ vectors $\vec{E}'n$ of the instantaneous electromagnetic field as measured by the antenna. It then determines $n$ vectors $\vec{E}n$ by compensating for the transfer function of the antenna. The vectors $\vec{E}n$ as determined in this way come close to the vectors of the real electromagnetic field.

By using the notation G for the matrix corresponding to the antenna transfer function, the vectors $\vec{E}n$ can thus be obtained by using the following formula:

$$\vec{E}n = G^{-1}(\theta,\varepsilon) \cdot \vec{E}'n$$

with $$G = \begin{bmatrix} Gxx(\theta,\varepsilon) & Gxy(\theta,\varepsilon) & Gxz(\theta,\varepsilon) \\ Gxy(\theta,\varepsilon) & Gyy(\theta,\varepsilon) & Gyz(\theta,\varepsilon) \\ Gxz(\theta,\varepsilon) & Gyz(\theta,\varepsilon) & Gzz(\theta,\varepsilon) \end{bmatrix}$$

In an improvement of these methods, two spaced-apart satellites are used that perform measurements simultaneously. Triangulation is then performed using the locations determined by the satellites, in such a manner as to maximize likelihood, thereby obtaining the location of the transmitter with improved accuracy.

Nevertheless, in some cases, although the electromagnetic field is transmitted linearly by a transmitter, it reaches the antenna with linear polarization after passing through the atmosphere. Other implementations are described below enabling a transmitter to be located with this type of polarization.

Thus, in a second embodiment of the invention the method concerns locating a transmitter from an antenna on a moving satellite. As shown in FIG. 2, depending on the time intervals between measurements, such a satellite can move quite considerably relative to the transmitter that it is to locate. Thus, the propagation direction of the electromagnetic field received by the satellite antenna varies between the measurements. By measuring an electromagnetic field vector it is possible to determine a plane perpendicular to said vector in which the propagation direction is contained. Thus, the intersection of such a plane with the surface of the earth can be defined. This intersection is generally circular in shape, and the transmitter is located somewhere on that circle. By taking measurements from two different positions at different instants, it is possible to determine the position of the transmitter by defining the point of intersection between the two resulting circles on the surface of the earth.

A third implementation of the invention provides a method enabling a transmitter to be located from two spaced-apart satellites. Each satellite performs measurements in non-simultaneous manner so as to determine an electromagnetic field vector. Respective planes can be determined that are perpendicular to each of these vectors. As in the preceding method, circles are defined on the surface of the earth. The transmitter is located where the circles intersect.

In a variant of these methods, additional measurements are performed simultaneously, such as differential Doppler measurements, interferometer measurements, or radio direction finding measurements. This can make it possible to locate the transmitter more accurately.

In another variant of these methods, frequency discrimination is performed on the received electromagnetic field. For example, it is possible to perform a Fourier transform on the received electromagnetic field. It is also possible to perform filtering and frequency-separating preprocessing on the received electromagnetic field so as to restrict measurements to a determined frequency band. This makes it possible to limit the processing of the components of the electromagnetic field to within a frequency resolution cell. Such a limitation makes it possible to distinguish between transmitters transmitting at different frequencies. This makes it possible to locate transmitters independently of their transmission frequency. This type of limitation also makes it possible to distinguish between transmitters operating at the same frequency but occupying different locations on the earth thus leading to different Doppler effects.

What is claimed is:

1. A method of locating a terrestrial transmitter by means of a geostationary satellite provided with an antenna, the method comprising the steps of:
    measuring, at the satellite, and at at least two different instants, three orthogonal components of an electromagnetic field transmitted by the terrestrial transmitter;
    calculating at least two electromagnetic field vectors from the measurements;
    determining the propagation direction of the electromagnetic field from the determined vectors; and
    locating the transmitter at the point of intersection between the surface of the earth and a straight line colinear with the propagation direction and passing through the satellite.

2. The locating method of claim 1, wherein the propagation direction of the electromagnetic field is determined by identifying a vector for which the square of the sum of its scalar products with the determined electromagnetic field vectors is at a minimum.

3. The locating method of claim 1, wherein the propagation direction of the electromagnetic field is determined by determining a vector defined by the sum of the vector products between at least two electromagnetic field vectors.

4. The locating method of claim 1, wherein the calculation step comprises multiplying the measured field components by the inverse of the antenna transfer function.

5. The method of claim 1, wherein locating is performed by at least two satellites, the method further comprising a step of triangulation on the locations determined by the two satellites.

6. A method of using a moving satellite to locate a terrestrial transmitter transmitting a linearly polarized electromagnetic field, the method comprising the steps consisting in:
    measuring, at the satellite, and at at least two different instants, three orthogonal components of an electromagnetic field transmitted by the terrestrial transmitter;
    calculating electromagnetic field vectors from the measurements;
    for each measurement, determining a plane containing the propagation direction of the measured electromagnetic field and the satellite, on the basis of the calculated vectors; and
    locating the transmitter at the intersection of a plurality of circles where the planes intersect the surface of the earth.

7. A method of using a plurality of satellites to locate a terrestrial transmitter transmitting a linearly polarized electromagnetic field, the method comprising the steps consisting in:
    measuring, at the satellites, and at a common instant, three orthogonal components of an electromagnetic field transmitted by the terrestrial transmitter;
    calculating electromagnetic field vectors from the measurements;
    for each measurement, determining a plane containing the propagation direction of the measured electromagnetic field and the satellite, on the basis of the calculated vectors; and
    locating the transmitter at the intersection of a plurality of circles formed by the intersections of the planes and the surface of the earth.

8. The method of claim 1, further comprising an additional measurement step using differential Doppler measurement, interferometry, or radio direction finding.

9. The method of claim 1, further comprising a step of frequency filtering the measured electromagnetic field.

10. A transmitter locating satellite having:

an antenna;

means for measuring, at the satellite, and at at least two different instants, three orthogonal components of an electromagnetic field transmitted by the terrestrial transmitter;

means for calculating at least two electromagnetic field vectors from the measurements, means for determining the propagation direction of the electromagnetic field from the determined vectors; and means for locating the transmitter at the point of intersection between the surface of the earth and a straight line colinear with the propagation direction and passing through the satellite.

* * * * *